United States Patent [19]

Wagner et al.

[11] 3,711,347
[45] Jan. 16, 1973

[54] METHOD OF SEALING AND LOCKING A FASTENER

[76] Inventors: David Prugh Wagner; John James Russell, both of 8501 W. Higgins Road, Chicago, Ill. 60631

[22] Filed: July 7, 1971

[21] Appl. No.: 160,497

Related U.S. Application Data

[62] Division of Ser. No. 782,185, Dec. 9, 1968, abandoned.

[52] U.S. Cl..........................156/91, 84/41, 84/50 R, 151/14.5, 151/14.74, 151/14.75, 156/92, 156/293, 156/295, 161/54
[51] Int. Cl. ..............................................B32b 7/12
[58] Field of Search ......156/293, 92, 295, 91; 84/41, 84/50 R; 151/14 DW, 14.5, 3, 41.74, 41.75; 161/54

[56] References Cited

UNITED STATES PATENTS

| | | | |
|---|---|---|---|
| 2,718,485 | 9/1955 | Samuely | 156/91 X |
| 3,093,177 | 6/1963 | Villo | 156/91 X |

*Primary Examiner*—Robert F. Burnett
*Assistant Examiner*—M. E. McCamish
*Attorney*—Thomas W. Buckman

[57] ABSTRACT

A fastener having an encircling mastic sealing and locking ring around the shank and positioned on or near the head of the fastener for sealing and locking the fastener in an apertured workpiece. The ring is formed of a compounded silicone resin capable of withstanding temperatures up to 400°F. for indefinite extended periods of time under vibrating conditions after final cure in situ, with the ring remaining dry and tack free, prior to final cure, at temperatures up to 180°F. or more.

5 Claims, 3 Drawing Figures

METHOD OF SEALING AND LOCKING A FASTENER

CROSS-REFERENCE TO RELATED APPLICATION

This is a division of application Ser. No. 782,185, filed Dec. 9, 1968, now abandoned.

BACKGROUND OF THE INVENTION

Metal fasteners such as screws, nuts and bolts, rivets, sheet metal snap fasteners, etc. have been used for many years to join together or hold metallic and/or nonmetallic parts. Although adequate in many ways as fasteners, they do not necessarily seal the aperture in the parts which are adapted to accept the fastener. As a result, channels may develop between the mated parts which allow gases, liquids, and even, in some instances, solids to break through the fastener joint. One of the most serious leakage problems is that of moisture but recently interest has been turned upon the problem of sealing fasteners against the creeping of fluids such as oil, grease and solvents out of an enclosed space through paths opened by the fastener.

Initially, natural rubber washers were used as sealants relying upon the resilience of the rubber to conform, under pressure, to the irregularities of the mated parts. However, natural rubber degrades over time and tends to crack, destroying its sealing characteristics and also to lose its resiliency thereby creating a loose joint. Many other materials such as waxes, gums, paints, synthetic resins, synthetic plastics, soft metals and synthetic rubbers have also been used to effect a seal with varying degrees of success.

Thus, the sealant problem in the industrial field is a large one and the requirements for a seal can be spelled out basically as follows:

a. Useful life. It must not degrade chemically or mechanically over the life of the fastened article. Since fasteners are exposed to many chemically active situations, it must, therefore, be immune to the action of water, oxygen, ozone, ultraviolet light, sulfur oxides, nitrogen oxides and many other chemical compounds such as the organic compounds used for oil, grease and solvents.

b. Mechanically the sealant under the heads of screws or other fasteners must be of such a nature that it will not crumble or tear, stretch or become fluid during assembly. Then, after it has been set in place, the sealant must not relax mechanically or chemically, thereby destroying or reducing the setting torque or fastening pressure.

c. The sealant must have some resilience. Thus, a concrete-type coating most likely would not be satisfactory as a sealant because it would not conform to the irregularities of the surfaces to be sealed leaving open channels for migration of materials.

In addition to these basic requirements, certain application requirements relating to the applying of the sealant to the fastener were required including sufficient fluidity for practical application, a short curing time at warm but not very hot temperatures and a low price to permit the article to be economically competitive to alternative designs.

Now, further requirements have been added by major users of fasteners to these indicated above. These include:

d. A mastic sealant which, prior to cure, is fluid so that it may be applied by flowing from a nozzle, dipping or spraying.

e. After application the wet mastic sealants must be dried to a soft, irregular, compressible, substantially uncured or partially cured substance which will not be tacky to the touch.

f. The dry mastic must remain dry and tack-free at temperatures up to 180°F. or more and have a shelf-life of over 12 months when stored.

g. The dry mastic must adhere to the surface of the fastener so that, even in bulk shipping containers, it will not be dislodged by other fasteners and drop to the bottom of the container as a useless powder or flake.

h. When the fastener is driven into the article to be fastened, the mastic must not interfere with a low driving torque or fastening pressure and is within the range of the current specifications of the customer.

i. Either heat, pressure, or a catalyst, or all may be used to cause the mastic sealant to set up into a firm leather-like cured mastic which retains the desirable property of sealing the fastener to the fastened article and additionally after curing provides a locking function by giving a positive breakaway torque greater than the seating torque, but not greater than 150 percent of the seating torque; however, neither heat nor the catalyst may have any effect on the mastic sealant below 200°F. That is, the mastic sealant must be chemically stable below 200°F. and hence the curing temperature must preferably be above 200°F.

j. The mastic sealant must be reuseable within 72 hours of the first seating torque application. In other words, the user must be able to readjust the fastener in position and apply the same seating torque without loss of its sealing properties.

k. The ultimate break-away torque must be at least equal to the seating torque and not greater than 150 percent of the maximum allowable seating torque, and, further, the back-off torque or breakaway torque should not be so great that the fastener itself breaks under the back-off load.

l. The mastic sealant must be capable of withstanding a temperature of 400°F. for 30 minutes in a radiant heat tunnel oven of the type normally utilized for curing paint on assemblies.

m. The cured mastic sealant must be capable of adhering without loss of strength at temperatures up to 400°F. and down to −40°F. for indefinite lengths of time under vibrating conditions.

n. The cured mastic sealant must not be affected by hot water, salt water solutions, hydrocarbons such as gasoline, kerosene, oils and greases, or by detergents, and must be immune to the various items set forth in sub-paragraph (a) hereinabove.

SUMMARY

This invention relates to a fastener, such as a screw, having a mastic sealing and locking element on the shank, or encircling the shank, or positioned on or near the head of the fastener for sealing and locking the fastener in an apertured workpiece. The mastic element may take the form of a ring formed of a compounded resin, preferably a compounded silicone resin which is capable of mating most, if not all, of the conditions set forth in sub-paragraphs (a) through (n) above. The mastic sealant in the preferred form may utilize one or more of the following items in conjunction with the resin:

1. A silicone resin dissolved in a suitable solvent which, when devoid or dried of solvent and cured, produces a soft, smooth plastic-like product;
2. A filler or fillers which provide body and strength to the cured mastic;
3. A solvent to provide the proper viscosity for application;
4. A catalyst which will cause the resin, when dried of solvent, and activated by heat or pressure to pass from the prepolymer stage into a cured high polymer;
5. In some cases a drying agent to absorb solvent and thus produce a faster drying composition; and
6. If desired, a pigment to give the required coloring.

DESCRIPTION OF THE PREFERRED EMBODIMENTS

Figure 1:
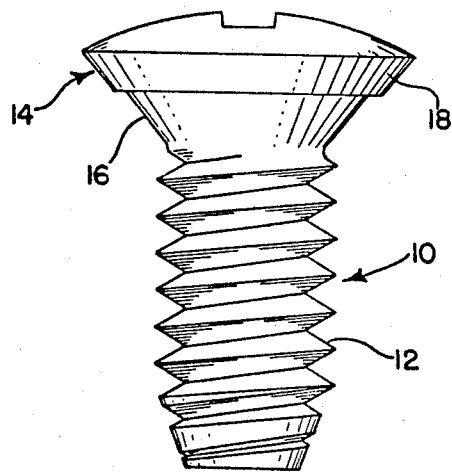
FIG. 1 is an elevational view of a screw of the type contemplated to be used in the present invention for application of the mastic sealing and locking ring.
Figure 2:
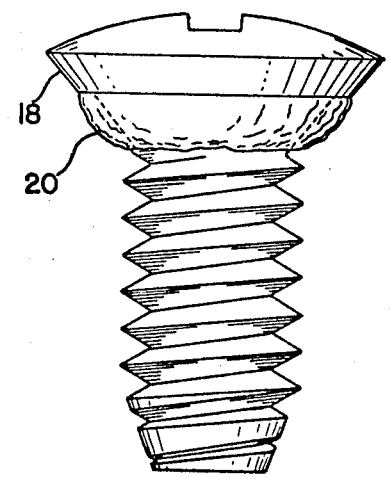
FIG. 2 is the same screw with the sealant applied.

Many silicone resins may be used for the purpose of this invention. These include methyl silicone resins, phenyl silicone resins, methylphenyl silicone resins, vinyl silicone resins and appropriate blends of these resins. It is not intended that the listing of these resins will limit the scope of choice available to practitioners of the present invention.

Fillers may be used to provide body and strength to the silicone resins. These include sand of varying grades, mica, kaolins or clays, asbestos, various kinds of siliceous fillers, diatomaceous earth, and silica, such as those commercially available under the trade names of Celite 165-S, Celite Super-Flos, Cab-O-Sil, or Santocel C.

Pigments may be ground into the composition and are only limited by their stability to the temperature at which the composite mastic sealants must function. Dyes are not generally acceptable because they fade at 400°F. A fine white composition may be obtained by using titanium dioxide of pigment grade.

A number of commercial grade solvents such as benzene, xylene, toluene, trichloroethylene, carbon-tetrachloride, acetone in small amounts, methyl ethyl ketone, etc. may be used to adjust the viscosity of the composition for practical application to the fastener.

Thickening agents, and/or drying agents are important if the composition must dry rapidly when applied to the fastener. This is particularly important when high speed production is used to produce the number of fasteners required in a reasonable period of time. It is quite possible to air dry the composition described below in the example but this may require a 24 to 48 hour drying period which would be impossible under actual production conditions. The use of thickening agents has little or no effect on the ultimate sealing qualities or the temperature resistance of the mastic. Recommended thickening agents include those sold under the commercial names of Bentone 18C, Bentone 34, Thixcin, etc. Thickening agents and thixotropes for rheological control are not meant to limit the invention since many are available and will be readily recognized by those experienced in the art.

Catalysts are generally added by the compounder in preparing the composition to be used or alternatively they can be included in the silicone resin solution supplied by the primary producer. If catalysts must be added by the compounder, these may include one or more of the silanes such as gamma-aminopropyl triethoxy silane, or octoates, naphthenates, etc. of iron, cobalt, zinc, manganese and other metal salts.

The following examples illustrate the invention:

EXAMPLE 1

The material from which sealing elements used in the present invention are formed is made of the following components:

| | parts by weight |
|---|---|
| Resin solution — A 60% solid solution in toluene of a methylphenyl silicone resin containing a total of 1.6 methyl and phenyl radicals per silicon atoms, with the ratio of methyl radicals to phenyl radicals being 1:1 (obtainable under the trade name "General Electric SR-224.") | 62.5 |
| Fillers —A. Water washed mica | 18.7 |
| B. Finely ground kaolin | 9.4 |
| Pigments—Titanium dioxide | 9.4 |

The materials are mixed together and then passed through a three roll mill or tumbled in a ball mill to obtain homogeneity. The catalyst is already in the resin solution as purchased and hence does not have to be added by the compounder. The time of mixing is determined by smearing a small sample on a metal plate. If there are no streaks or lumps, adequate dispersion has been obtained.

The proportions of the components in the above example may be varied considerably and the limits in percent by weight are as follows: The resin may contain a total of 1.4 to 1.7 methylphenyl radicals per silicon atom, however, the ratio of methyl to phenyl radicals is approximately 1:1. The total filler may be varied from 0 percent in the case of a thin film of resin to 40 percent in the case of a thicker material. The ratio of solvent to resin may be varied from 30 to 60 percent solvent and 40 to 70 percent silicone resin. The pigment can be varied from 0 to 15 percent, while any other suitable pigment, other than titanium dioxide, which is capable of withstanding the temperatures to which the resin will be exposed is suitable.

EXAMPLE 2

A second preferred mastic sealing composition is the following:

| | parts by weight |
|---|---|
| Composition of Example 1 | 100 |
| Thixotrope — A thickening agent or solid (obtainable under the trade name "Thixcin-R." | 5 |

This produces a heavy paste which must be passed through the three roll mill to provide adequate dispersion; to produce a composition of the required viscosity for application to fasteners it generally is necessary to add xylene. In many instances it has been necessary to add 0 to one-tenth part of xylene to 2 parts of Example 2 to obtain a useful composition. The same smear test used in Example 1 may be used to determine the effectiveness of the dispersion of all the fillers and the pigment.

The preferred test for suitable resins is to blend the chosen silicone resins with fillers, catalyst and solvent to the proper application viscosity. The composition so obtained is then applied to a threaded metallic fastener and dried for three minutes up to 550° or longer periods at lower temperatures. When cold, the fastener is turned into a tapped hole or telescoped into a hole in a steel plate and a nut attached to the other side of the plate. In the case of a 5/16–18 × 1₁ flathead pilot point sealing screw with a phosphate and oil coating, the fastener is tightened to a seating torque of 300 in. lb. The assembly is now heated for 30 minutes at 400°F. When cold, the breakaway torque is determined and the fastener removed from the assembly. A proper blend of silicone resins and fillers with a catalyst has been made when part of the composition remains on the bearing surface of the sealing screw and part of the composition remains on the side of the hole of the test plate. In other words, the adhesion of the composition is greater to both metal surfaces than the cohesion of the composition itself. In addition, the breakaway torque is preferably in a range between 100 to 150 percent or more of the seating torque.

Referring now to the drawings, the fastener to be used with the sealant can be a screw including a threaded shank 12 and an oval head 14 with a countersunk portion having an undercut recess 16 adjoining the juncture of the head with the threaded shank 12 leaving a relatively narrow bearing area 18. The upper end of the head, of course, can be provided with a driving recess either in the form of a slot or a cruciform recess commonly known as Phillips or Pozidriv recess. Other head forms such as flatheads, truss heads and round heads are equally useable.

As is well known in the art of applying mastics to the underside of the head of a screw, the screw if preferably placed head down in a rotatable carrier with the shank extending upwardly. The carrier is passed in front of a nozzle which ejects a thin stream of mastic material into the recess 16 as the screw is being rotated, by apparatus not shown. This action deposits a semifluid ring of material 20 having a volume sufficient to fill and slightly in excess of the volume of the recess 16 formed by undercutting head 14. It will be appreciated, however, then in other applications, not shown, the material can be applied to the threads to prevent egress of materials between mating threads or it may be a series of spaced longitudinally extending elements on the head or shank which will be wiped over into engagement with the head and the workpiece when the fastener is inserted in the workpiece.

The fastener 10 is then either air dried for an extended period of time of 1 to 24 hours at ambient temperatures or moved in its carrier through a drying tunnel oven for approximately 15 minutes at a temperature not to exceed 170°– 200°F. However, increased temperatures for shorter periods of time may also be utilized; for example 7 minutes up to 550°F. This will remove sufficient solvent to leave a firm, tack-free coating on the fastener. The fastener is then cooled and either shipped or stored ready for shipment. While one means of applying the mastic sealant has been discussed, it will be appreciated that other means such as dipping or striping can be used.

Application of the fastener may be made on any kind of metallic surface or those surfaces which have been phosphatized, parkerized or plated. Even surfaces which have been phosphate-treated and subsequently oiled with a corrosion resistant oil will accept the mastic.

Figure 3:
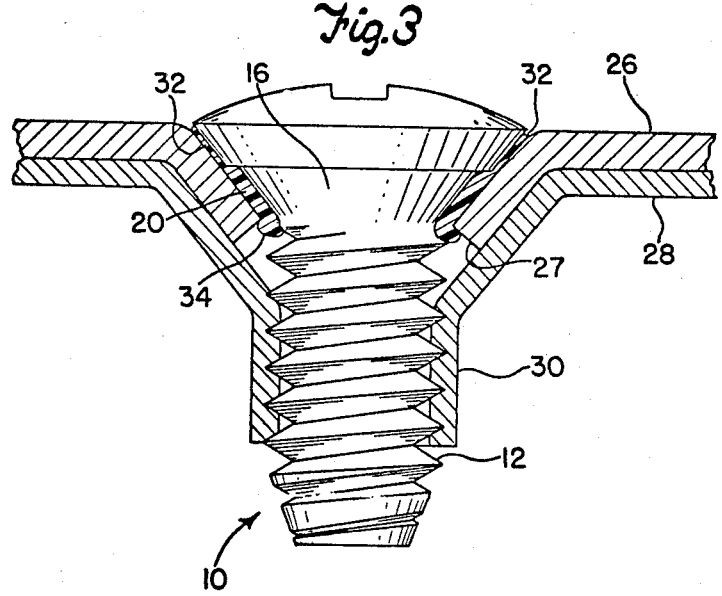
FIG. 3 is an elevational view in partial section showing a typical application of the present invention.

An example of an application of such a fastener can be found in FIG. 3 wherein the screw 10 is utilized to connect two countersunk members. The outer member 26 being supplied with a countersunk clearance hole 27 which is larger in diameter than the major diameter of the shank 12 and a second member 28 having a countersunk portion complementary to the countersunk portion of panel 26 and further having an extruded tapped hole 30 adapted to accept the threaded shank 12. In this embodiment the fastener is driven into the parts to be joined and brought to a selected seating torque with the mastic sealant ring being compressed against mating part 26. If the volume of mastic compound is in excess of the volume of recess 16 on the head, it may, when squeezed against the countersunk portion of the outer sheet 26, and, depending upon its rheological properties, be extruded slightly out of the cavity 16 to form a thin film 32 adjacent the upper portion 18 of the oval head or as a protuberant ring 34 adjacent the clearance hole 27.

The embodiments of the present invention are particularly adapted for use with a product in which the member 28 provides an enclosure which can be filled with a hydrocarbon such as oil or grease or other lubricious material to lubricate the mechanical functioning of elements, not shown, contained within member 28. The panel 26 represents the outer surface or structural member of a product to which the element 28 is mounted interiorly thereof. When the product is painted or lacquered on the upper or outer surface, as viewed in the drawings, of the plate 26 it then is passed through a baking oven which generally operates in the vicinity of 400°F. with the part being in the oven for approximately 30 minutes. Previously, sealants had been used to prevent the egress of the hydrocarbons from the interior of member 28. These failed under pressure and heat and the present invention provided the solution to this problem. It must be recognized, by those skilled in the art, that fasteners other than a screw threaded fastener can be utilized to secure two members together in joined relation and the present invention contemplates the use of such fasteners.

The proposed mastic sealants serve solely as a sealing means in those conditions where the fastener is used below 200°F. The locking feature will take effect when the mastic is subjected either to high pressures or temperatures in excess of 350°F. for periods in excess of 30 minutes whereby the prepolymer is cured to a high polymer which evidences a greater adhesion to the fastener and workpiece than the cohesion of the material itself. However, the mastic will continue to serve as an effective sealing means at elevated temperatures of from 400° to 500°F. Additionally, the polymers, after curing, are adapted to withstand temperatures down to −40°F. without embrittlement or breakdown with the opposite extreme in usage at temperatures up to and exceeding 400°F. for extensive periods of time under vibratory conditions.

While other forms of fasteners and resins will be apparent to those skilled in the art, we wish only to be limited by the appended claims.

We claim:

1. The method of sealing a joint including a fastener having an enlarged head and an elongated shank applied through an aperture in a workpiece comprising the steps of applying a washer-like sealing member of soft, tacky extrudeable sealing material to surround the shank with one face of the sealing member engaging the enlarged head, passing the sealing member through a drying oven at a temperature not in excess of 500°F., cooling the fastener and sealer to ambient temperature, applying the fastener to the apertured workpiece whereby the opposite face of the sealing member engages said workpiece around the opening therein, drawing the workpiece and fastener together into pressure engagement whereby the sealing material intimately engages the workpiece and fastener in sealing relationship, thereafter curing the sealing member in situ by subjecting the assembled fastener and workpiece to the curing effects of a baking oven in excess of 400°F. for an extended period of time whereby said sealant material is bonded to the fastener head and the workpiece and exhibits a greater degree of adhesion than cohesion.

2. The method as set forth in claim 1 wherein said drying oven has a temperature range of 170°–200°F. and a time cycle of ten to fifteen minutes which will produce a firm tack-free coating of sealant material on the fastener and permit normal handling of the fastener without dislodgement of the sealant.

3. The method as set forth in claim 1 wherein said drying oven has a temperature range of 425°–500°F. and a time cycle of 5 to 7 minutes to drive off substantially all of the solvent to carry out a partial cure thereby forming a prepolymer which is a firm tack-free coating of sealant material on the fastener.

4. The method as set forth in claim 1 wherein the baking oven has a time cycle for the cure of the sealant of approximately 30 minutes.

5. The method set forth in claims 1 wherein the sealing material is formed of a silicone resin including one or more of the following resins chosen from the group consisting of methyl silicone, phenyl silicone, methylphenyl silicone, or vinyl silicone.

* * * * *